(12) United States Patent
Matsushita et al.

(10) Patent No.: US 9,819,049 B2
(45) Date of Patent: Nov. 14, 2017

(54) BATTERY AND ELECTRONIC APPARATUS

(71) Applicant: Sony Corporation, Tokyo (JP)

(72) Inventors: Naoki Matsushita, Kanagawa (JP); Takao Fujii, Tokyo (JP); Yuichi Sabi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/635,202

(22) Filed: Mar. 2, 2015

(65) Prior Publication Data
US 2015/0255827 A1    Sep. 10, 2015

(30) Foreign Application Priority Data
Mar. 4, 2014    (JP) ................. 2014-041831

(51) Int. Cl.
H01M 10/05      (2010.01)
H01M 10/052     (2010.01)
H01M 10/0585    (2010.01)
H01M 2/20       (2006.01)
H01M 2/30       (2006.01)
H01M 2/02       (2006.01)
H01M 2/10       (2006.01)
H01M 10/0562    (2010.01)
H01M 4/58       (2010.01)

(52) U.S. Cl.
CPC ......... *H01M 10/052* (2013.01); *H01M 2/021* (2013.01); *H01M 2/0212* (2013.01); *H01M 2/1061* (2013.01); *H01M 2/204* (2013.01); *H01M 2/30* (2013.01); *H01M 10/0562* (2013.01); *H01M 10/0585* (2013.01); *H01M 4/5825* (2013.01)

(58) Field of Classification Search
CPC .......... H01M 10/052; H01M 10/0585; H01M 2/204; H01M 2/30; H01M 2/0212; H01M 2/1061; H01M 4/5825; Y02E 60/122
See application file for complete search history.

(56) References Cited

U.S. PATENT DOCUMENTS

| 2003/0162094 | A1* | 8/2003 | Lee | H01M 4/0421 |
| | | | | 429/231.95 |
| 2012/0177981 | A1* | 7/2012 | Kim | H01M 2/266 |
| | | | | 429/163 |
| 2013/0307485 | A1* | 11/2013 | He | H01M 4/364 |
| | | | | 320/130 |
| 2014/0050967 | A1* | 2/2014 | Fuhr | H01M 2/305 |
| | | | | 429/158 |
| 2014/0127550 | A1* | 5/2014 | Roh | H01M 2/347 |
| | | | | 429/154 |

FOREIGN PATENT DOCUMENTS

JP    2006-164863    6/2006
WO    2010/010717    1/2010

* cited by examiner

Primary Examiner — Mark F Huff
Assistant Examiner — Monique Wills
(74) Attorney, Agent, or Firm — K&L Gates LLP

(57) ABSTRACT

A battery includes a plurality of unit batteries arranged in a stacking direction, each unit battery including a battery element portion and at least one connection portion extending from a side of the battery element portion. A plurality of the connection portions extend from a first side of the unit batteries, and a distance in the stacking direction between at least two of said connection portions decreases as said connection portions extend away from the sides of the respective battery element portions.

19 Claims, 5 Drawing Sheets

BATTERY AND ELECTRONIC APPARATUS

CROSS REFERENCES TO RELATED APPLICATIONS

The present application claims priority to Japanese Priority Patent Application JP 2014-041831 filed in the Japan Patent Office on Mar. 4, 2014, the entire content of which is hereby incorporated by reference.

BACKGROUND

The present application relates to a battery and an electronic apparatus.

In the field of the battery, a stacking-type unit battery having a configuration in which battery members such as a pair of positive electrode and negative electrode are stacked is used. Further, a stacking-type battery including a plurality of stacking-type unit batteries stacked on one another has been proposed. As a mode of the stacking-type battery, an all-solid-state battery using a solid-state electrolyte containing no organic electrolyte as a stacked battery member has been proposed from viewpoint of security and reliability. As a mode of this all-solid-state battery, an all-solid-state thin-film battery is actively developed. This all-solid-state thin-film battery is obtained by forming battery members (collector, active material, electrolyte, and the like) constituting the battery from thin films.

As the techniques related to the battery of the present application, those described in PCT International Publication No. WO10/010717 and Japanese Patent Application Laid-open No. 2006-164863.

SUMMARY

It is desirable to increase volume energy density of a battery.

Therefore, the present application has been made to provide a battery and an electronic apparatus with increased volume energy density.

In an embodiment, a battery includes a plurality of unit batteries arranged in a stacking direction, each unit battery including a battery element portion and at least one connection portion extending from a side of the battery element portion. A plurality of the connection portions extend from a first side of the unit batteries, and a distance in the stacking direction between at least two of said connection portions decreases as said connection portions extend away from the sides of the respective battery element portions.

In another embodiment, a battery includes a plurality of unit batteries arranged in stacking direction, each unit battery including a battery element portion and at least one connection portion extending from a side of the battery element portion. A plurality of the connection portions extend from a first side of the unit batteries and are connected by a conductive agent.

According to an embodiment of the present application, there is provided a battery including: a main body portion including a plurality of stacked battery element portions; and a terminal portion in which a plurality of connection portions extended in the same direction from each of the plurality of battery element portions are conducted to each other via a conductive agent provided between the connection portions, each of connection portion combinations each formed of the connection portions adjacent to each other in a stacking direction being set to have one of a first structure in which a part of one connection portion and a part of the other connection portion overlap with each other in the stacking direction, and a second structure in which an entire portion of the one connection portion and an entire portion of the other connection portion are prevented from overlapping with each other in the stacking direction.

According to an embodiment of the present application, there is provided a battery including: a main body portion including a plurality of stacked electrode portions; and a terminal portion in which a plurality of connection portions extended in the same direction from each of the plurality of electrode portions are conducted to each other via a conductive agent provided between the connection portions, each of connection portion combinations each formed of the connection portions adjacent to each other in a stacking direction including a laminated electrode body that is set to have one of a first structure in which a part of one connection portion and a part of the other connection portion overlap with each other in the stacking direction, and a second structure in which an entire portion of the one connection portion and an entire portion of the other connection portion are prevented from overlapping with each other in the stacking direction.

According to an embodiment of the present application, there is provided an electronic apparatus including the above-mentioned battery.

According to embodiments of the present application, an effect of increasing a volume energy density is provided.

These and other objects, features and advantages of the present disclosure will become more apparent in light of the following detailed description of best mode embodiments thereof, as illustrated in the accompanying drawings.

Additional features and advantages are described herein, and will be apparent from the following Detailed Description and the figures.

DETAILED DESCRIPTION (Outline of Present Application)

Figure 1A:
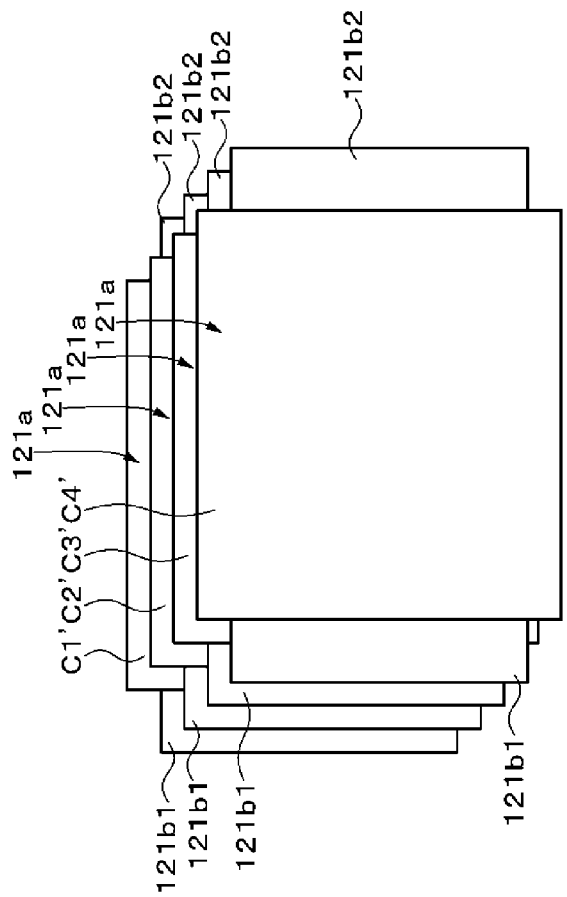
FIG. 1A is a schematic diagram showing a configuration example of an all-solid-state thin-film battery in related art.
Figure 1B:
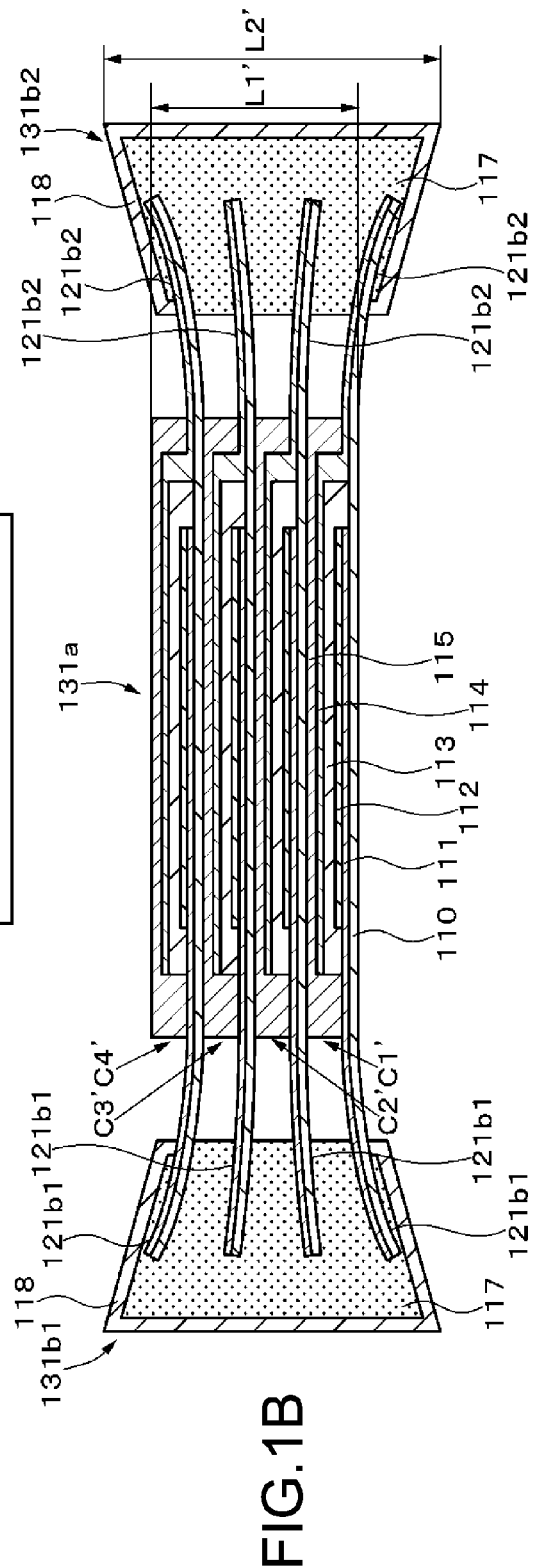
FIG. 1B is a schematic cross-sectional view showing a configuration example of the all-solid-state thin-film battery in the related art.

First, for easy understanding of the present application, the outline of the present application will be described. In the field of the battery, a stacking-type all-solid-state thin-film battery having a configuration in which a plurality of unit batteries are stacked has been proposed. FIG. 1A is a schematic diagram showing a configuration example of the all-solid-state thin-film battery related to the present application. FIG. 1B is a schematic cross-sectional view showing a configuration example of the all-solid-state thin-film battery related to the present application.

Unit batteries C1' to C4' shown in FIGS. 1A and 1B are thin-film all-solid-state batteries (unit batteries). The unit batteries C1' to C4' include battery element portions 121a that stores electric energy and connection portions 121b1 and 121b2 that take an electric current from the battery element portions 121a to the outside. The battery element portion 121a has a stacking structure in which a substrate 110, a positive-electrode-side collector film 111, a positive-electrode active material film 112, a solid-state electrolyte film 113, and a negative-electrode-side collector film 114 are stacked in the stated order and entirely covered with an entire protective film 115.

Each of the connection portions 121b1 is constituted of one side end portion of the substrate 110 and the positive-electrode-side collector film 111 formed on one surface of the one side end portion of the substrate 110. Each of the connection portions 121b2 is constituted of other side end portion of the substrate 110 and the negative-electrode-side collector film 114 formed on one surface of the other side end portion of the substrate 110.

A stacking-type all-solid-state thin-film battery (combined battery) includes a battery main body portion 131a in which the battery element portions 121a are stacked, a terminal portion 131b1, and a terminal portion 131b2.

The terminal portion 131b1 is one in which the plurality of connection portions 121b1 and a conductive agent 117 filling between the connection portions 121b1 are covered with a protective foil 118, to thereby be bundled together. The protective foil 118 and the positive-electrode-side collector film 111 are electrically conducted to each other via the conductive agent 117.

Similarly, the terminal portion 131b2 is one in which the plurality of connection portions 121b2 and the conductive agent 117 filling between the connection portions 121b2 are covered with the protective foil 118, to thereby be bundled together. The protective foil 118 and the negative-electrode-side collector film 114 are electrically conducted to each other via the conductive agent 117. Note that, hereinafter, the connection portions 121b1 and the connection portions 121b2 will be referred to as connection portions 121b unless they are differentiated from each other and the terminal portions 131b1 and 131b2 will be referred to as terminal portions 131b unless they are differentiated from each other.

In such an all-solid-state thin-film battery, it is one of main problems to increase the volume energy density. The unit batteries C1' to C4' include battery constituent members formed of thin films, and hence the thickness of each of the battery element portions 121a can be made very thin. Further, a difference between the thickness of the battery element portion 121a and the thickness of the connection portion 121b is equal to or smaller than, for example, several μm. The battery shown in FIGS. 1A and 1B has a structure in which an entire portion of one of combinations of connection portions formed of the connection portions 121b adjacent to one another in the stacking direction via the conductive agent and an entire portion of the other overlap with each other in the stacking direction.

In the case where the difference between the thickness of the battery element portion 121a and the thickness of the connection portion 121b is small, in the battery having the above-mentioned structure, the influence of the thickness of the conductive agent filling between the connection portions is increased. Further, a thickness L2' of the terminal portion 131b is larger than a thickness L1' of the battery main body portion 131a. Consequently, the battery volume is increased. Therefore, the volume energy density of the entire battery is reduced.

In contrast, according to embodiments of the present application, the combination of connection portions of the connection portions 121b adjacent to one another in the stacking direction is set to have a predetermined structure, and hence the thickness of the conductive agent 117 filling between the connection portions 121b of the unit batteries can be made thin. At the same time, the thickness L2' of the terminal portions 131b can be set to be equal to or smaller than the thickness L1' of the battery main body portion 131a. With this, it is possible to increase the volume energy density of the all-solid-state thin-film battery.

Hereinafter, embodiments of the present application will be described with reference to the drawings. Note that the descriptions will be made in the following order.

1. First Embodiment (First Example of Battery)
2. Second Embodiment (Second Example of Battery)
3. Third Embodiment (Third Example of Battery)
4. Application Examples (Electronic Apparatus Incorporating Battery, etc.)
5. Other embodiments (Modified Examples)

Note that embodiments and the like described hereinafter are favorable, specific examples of the present application and the contents of the present application are not limited to these embodiments and the like. Further, effects shown in the present specification are merely examples and not limited. An effect other than the shown effects can exist.

1. First Embodiment

Figure 2A:
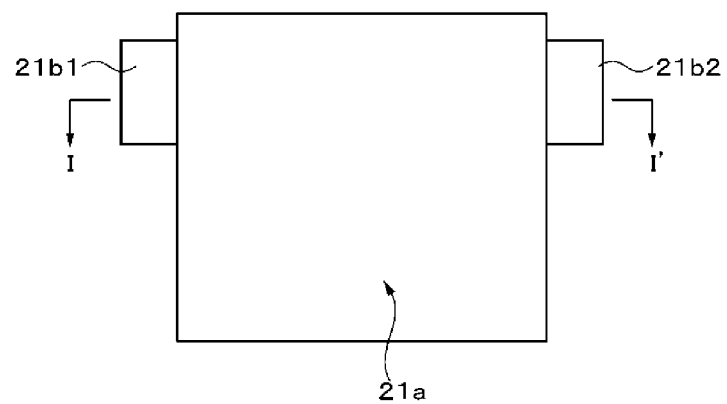
FIG. 2A is a schematic diagram showing a configuration of a unit battery.
Figure 2B:
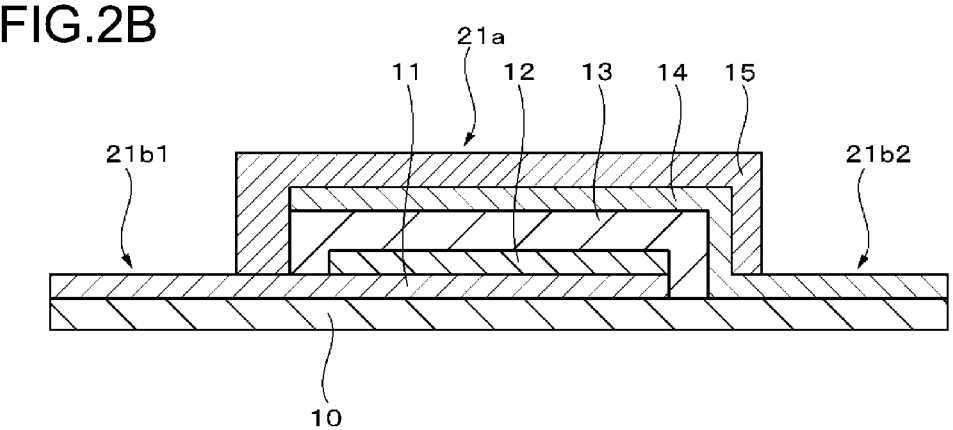
FIG. 2B is a schematic cross-sectional view taken along the line I-I' of FIG. 2A.
Figure 3A:
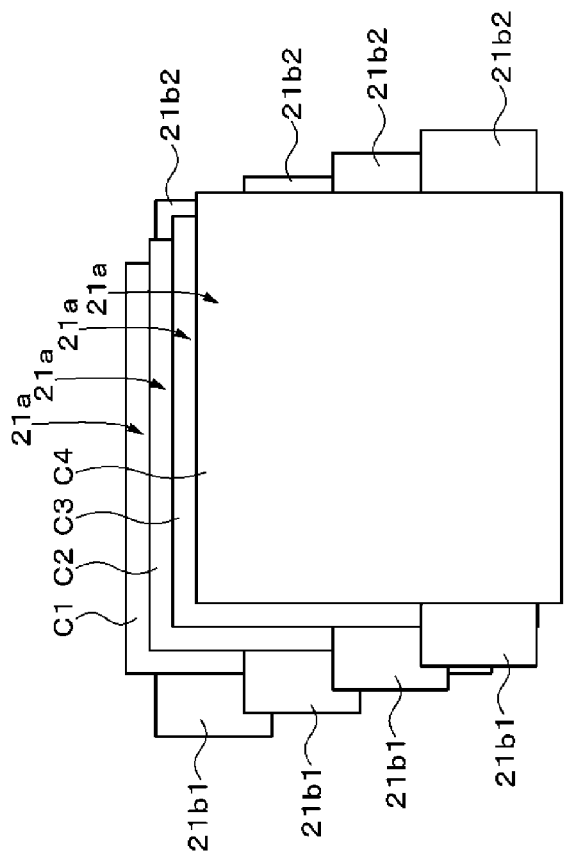
FIG. 3A is a schematic diagram showing a configuration example of an all-solid-state thin-film battery according to a first embodiment of the present application.
Figure 3B:
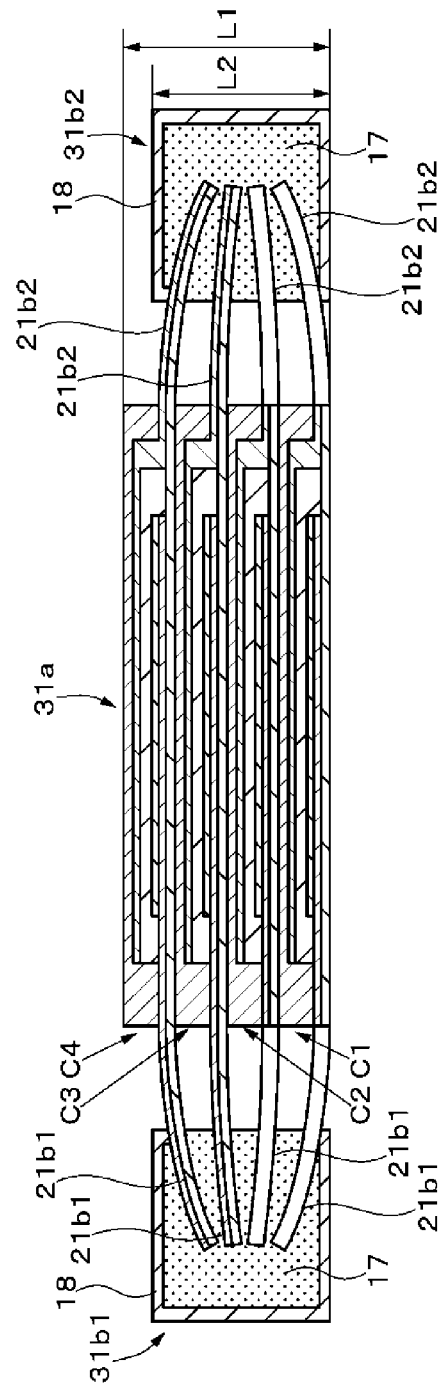
FIG. 3B is a schematic cross-sectional view showing a configuration example of the all-solid-state thin-film battery according to the first embodiment of the present application.
Figure 4A:
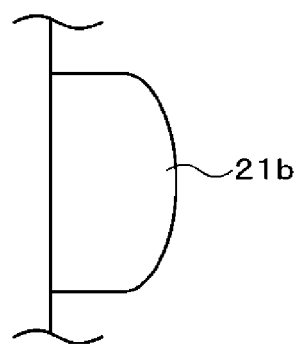
FIG. 4A is a schematic diagram showing a first modified example of a configuration of a connection portion.
Figure 4B:
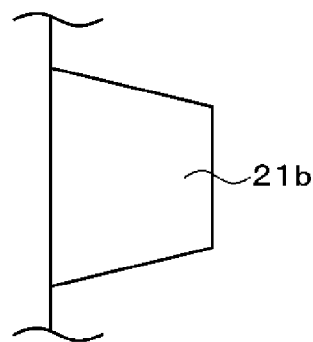
FIG. 4B is a schematic diagram showing a second modified example of a configuration of a connection portion.
Figure 4C:
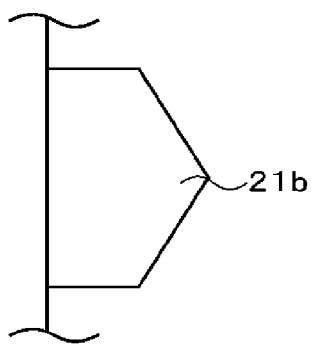
FIG. 4C is a schematic diagram showing a third modified example of a configuration of a connection portion.
Figure 4D:
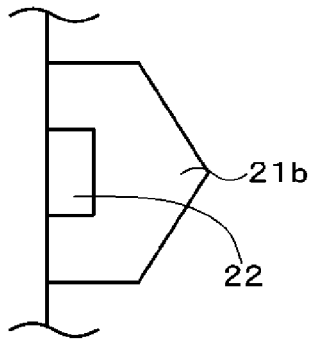
FIG. 4D is a schematic diagram showing a fourth modified example of a configuration of a connection portion.

A battery according to the first embodiment of the present application will be described with reference to the drawings. The battery according to the first embodiment of the present application is a stacking-type battery (combined battery) including a plurality of unit batteries stacked on one another. FIG. 2A is a schematic diagram showing a configuration of the unit battery. FIG. 2B is a schematic cross-sectional view taken along the line I-I' of FIG. 2A. FIG. 3A is a schematic diagram showing a stacking structure in which a plurality of unit batteries are overlapped with one another. FIG. 3B is a schematic cross-sectional view of the battery according to the first embodiment of the present application.

Hereinafter, a configuration example of a unit battery will be first described in detail and then an entire configuration example of a stacking-type battery (combined battery) including a plurality of unit batteries stacked on one another will be described in detail.

(Unit Battery)

The unit battery is typically a lithium secondary battery in which, for example, lithium that is a reactant in electrode reaction (hereinafter, referred to as electrode reactant) is moved between a pair of positive and negative electrodes due to charge/discharge. Note that, in the present specification, it is assumed that the lithium secondary battery includes one in which lithium metal is deposited in a negative electrode during charge. The unit battery is typically a battery in which, for example, a pair of positive and negative electrodes and a battery constituent member layer such as a solid-state electrolyte are stacked on one another. The unit battery is, for example, a thin-film type solid-state electrolyte secondary battery (all-solid-state battery) in which a pair of positive and negative electrodes and battery constituent members such as a solid-state electrolyte are formed of thin films.

This solid-state electrolyte secondary battery includes a battery element portion 21a including a positive-electrode-side layer, a negative-electrode-side layer, and a solid-state electrolyte layer between the positive-electrode-side layer and the negative-electrode-side layer. In this solid-state electrolyte secondary battery, the positive-electrode-side layer is on a positive electrode side with respect to the solid-state electrolyte layer with the solid-state electrolyte layer being a boundary. In the example shown in FIGS. 2A and 2B, the positive-electrode-side layer includes, for example, a positive-electrode active material film 12 and a positive-electrode-side collector film 11. The positive-electrode active material film 12 is a positive-electrode active material layer. The positive-electrode-side collector film 11 is a positive-electrode-side collector film. The positive-electrode active material film 12 and the positive-electrode-side collector film 11 are placed on the positive electrode side with respect to a solid-state electrolyte film 13 that is a solid-state electrolyte layer. In this solid-state electrolyte secondary battery, the negative-electrode-side layer is placed on a negative electrode side with respect to the solid-state electrolyte layer with the solid-state electrolyte layer being a boundary. In the example shown in FIGS. 2A and 2B, the negative-electrode-side layer includes, for example, a negative-electrode-side collector film 14. The negative-electrode-side collector film 14 is a negative-electrode-side collector layer and placed on the negative electrode side with respect to the solid-state electrolyte film 13 that is the solid-state electrolyte layer.

As shown in FIGS. 2A and 2B, this solid-state electrolyte battery includes the battery element portion 21a and a connection portion 21b1 and a connection portion 21b2 outwardly extended from the battery element portion 21a. Electric energy is stored in the battery element portion 21a and the electric current is taken out to the outside by the connection portion 21b1 and the connection portion 21b2.

(Battery Element Portion)

The battery element portion 21a includes a laminated body in which a substrate 10, the positive-electrode-side collector film 11, the positive-electrode active material film 12, the solid-state electrolyte film 13, and the negative-electrode-side collector film 14 are stacked in the stated order and are entirely covered with an entire protective film 15.

The battery element portion 21a has a rectangular plane shape, for example. The connection portion 21b1 is outwardly extended from one side of two opposed sides of the battery element portion 21a. The connection portion 21b2 is outwardly extended from the other side of the two opposed sides of the battery element portion 21a. Note that the connection portion 21b1 may be outwardly extended from one side of two adjacent sides of the battery element portion 21a and the connection portion 21b2 may be outwardly extended from the other side of the two adjacent sides of the battery element portion 21a. Alternatively, both of the connection portion 21b1 and the connection portion 21b2 may be outwardly extended from the same side of the battery element portion 21a. The plane shape of the battery element portion 21a is not limited to the rectangular shape.

(Connection Portion)

The connection portion 21b1 has, for example, a rectangular plane shape. The connection portion 21b1 is constituted of one side end portion of the substrate 10 and the positive-electrode-side collector film 11 formed on one surface of the one side end portion of the substrate 10. In the connection portion 21b1, the positive-electrode-side collector film 11 is not covered with the entire protective film 15 and is exposed. The connection portion 21b2 has, for example, a rectangular plane shape. The connection portion 21b2 is constituted of the other side end portion of the substrate 10 and the negative-electrode-side collector film 14 formed on one surface of the other side end portion of the substrate 10. In the connection portion 21b2, the negative-electrode-side collector film 14 is not covered with the entire protective film 15 and is exposed. The exposed portion of the positive-electrode-side collector film 11 included in the connection portion 21b1 and the exposed portion of the negative-electrode-side collector film 14 included in the connection portion 21b2 serve as terminals for taking out an electric current to the outside. Note that, hereinafter, the connection portion 21b1 and the connection portion 21b2 will be referred to as connection portions 21b unless they are differentiated from each other.

Hereinafter, members (member layers) constituting the unit battery will be described in detail. Note that the thickness of each of the member layers is typically selected from, for example, a range of 100 nm or more and 20 μm or less. The thickness of the unit battery is a sum of thicknesses of the member layers. A thickness L1 of the battery main body portion is typically expressed by the thickness of the unit battery*the number of stacked unit batteries. Note that the thickness of each member layer, the thickness of the unit battery, and the thickness L1 of the battery main body portion are not limited to the those described above and may depart from the above-mentioned numerical range.

(Substrate)

Examples of the substrate 10 can include a substrate formed of an electrical insulating material such as glass, alumina, and resin, a substrate formed of a semiconductor material such as silicon, and a substrate formed of a conductive material such as alumina, copper, and stainless steel. The substrate 10 may be hard or may be flexible. A wide variety of substrates can be used. Examples of the substrate made of a resin (resin substrate) can include a polycarbonate (PC) resin substrate, a fluororesin substrate, a polyethylene terephthalate (PET) substrate, a polybutylene terephthalate (PBT) substrate, a polyimide (PI) substrate, a polyamide (PA) substrate, a polysulfone (PSF) substrate, a polyether sulfone (PES) substrate, a polyphenylene sulfide (PPS) substrate, a polyether ether ketone (PEEK) substrate, a polyethylene naphthalate (PEN), and a cycloolefin polymer (COP). Note that, although the material of this substrate is not particularly limited, a substrate having low hygroscopicity and having moisture resistance is more favorable.

(Positive-Electrode-Side Collector Film)

Cu, Mg, Ti, Fe, Co, Ni, Zn, Al, Ge, In, Au, Pt, Ag, Pd, or the like or an alloy containing any of them can be used as the material of the positive-electrode-side collector film 11.

(Positive-Electrode Active Material Film)

A positive-electrode active material constituting the positive-electrode active material film 12 only needs to be a material easily storing/desorbing lithium ions and being capable of causing the positive-electrode active material film 12 to store/desorb many lithium ions. Further, the positive-electrode active material may be a material having a high potential and a small electrochemical equivalent. An oxide or a phosphorus compound including Li and at least one of Mn, Co, Fe, P, Ni, Si, and Cr or a sulfur compound is exemplified for the positive-electrode active material. Specifically, there are exemplified lithium-manganese oxide such as $LiMnO_2$ (lithium manganate), $LiMn_2O_4$, and $Li_2Mn_2O_4$, lithium-cobalt oxide such as $LiCoO_2$ (lithium cobalt oxide) and $LiCo_2O_4$, lithium-nickel oxide such as $LiNiO_2$ (lithium nickelate) and $LiNi_2O_4$, lithium-manganese-cobalt oxide such as $LiMnCoO_4$ and $Li_2MnCoO_4$, lithium-titanium oxide such as $Li_4Ti_5O_{12}$ and $LiTi_2O_4$ and further $LiFePO_4$ (lithium iron phosphate), titanium sulfide ($TiS_2$), molybdenum sulfide ($MoS_2$), iron sulfide (FeS, $FeS_2$), copper sulfide (CuS) and nickel sulfide ($Ni_3S_2$), bismuth oxide ($Bi_2O_3$), bismuth plumbate ($Bi_2Pb_2O_5$), copper oxide (CuO), vanadium oxide ($V_6O_{13}$), niobium selenide ($NbSe_3$). Alternatively, a mixture thereof can also be used. Considering the deposition properties and the cycle stability and potential of the battery, a lithium composite oxide including Co or Mn and Li such as $LiCoO_2$ and $LiMnO_2$ is favorable.

The positive-electrode active material film 12 may be formed of a lithium phosphoric acid compound in amorphous state. For example, the positive-electrode active material film 12 is formed of a lithium phosphoric acid compound in amorphous state containing Li, P, any element M1 selected from Ni, Co, Mn, Au, Ag, and Pd, and 0.

The lithium phosphoric acid compound has the following excellent characteristics as the positive-electrode active material. That is, the lithium phosphoric acid compound has a high potential with respect to the Li+/Li pair. The lithium phosphoric acid compound is excellent in potential flatness, that is, potential variations due to composition changes are small. The lithium phosphoric acid compound also has a high composition ratio of lithium, and hence has a large capacity. The lithium phosphoric acid compound has a high electrical conductivity. Unlike a crystalline positive-electrode active material, the collapse of the crystal structure or the like due to repeated charge/discharge does not occur, and hence the charge-discharge cycle characteristics are also excellent. Further, the lithium phosphoric acid compound can be formed without annealing, simplification of the processes, an improvement of the yield, and use of the resin substrate are possible.

For example, the positive-electrode active material film 12 may be formed of a lithium phosphoric acid compound expressed by Formula (1) as the lithium phosphoric acid compound as described above.

$$Li_xNi_yPO_z \qquad \text{Formula (1)}$$

(Where, x denotes a composition ratio of lithium. Y denotes a composition ratio of nickel. X is $0<x<8.0$. Y is $2.0 \le y \le 10$. Z denotes a composition ratio of oxygen. Z becomes a ratio at which oxygen is stably contained depending on the composition ratio of Ni and the composition ratio of P.)

In Formula (1), it is favorable that the range of the composition ratio x of lithium is $0<x<8$. Although an upper limit of the composition ratio x of lithium is not particularly limited, the limit for keeping an electrical potential becomes an upper limit of the composition ratio x of lithium. As the range that we confirmed, the composition ratio x of lithium is favorably lower than 8. Further, the range of the composition ratio x of lithium is favorably $1.0 \le x < 8$. If the composition ratio x of lithium is lower than 1.0, the impedance is large and charge/discharge cannot be performed.

In Formula (1), the range of the composition ratio y of Ni is favorably $2.0 \le y \le 10.0$ because a sufficient charge-discharge capacity can be obtained. For example, if the composition ratio y of Ni is lower than 2.0, the charge-discharge capacity is sharply reduced. Although the upper limit of the composition ratio y of Ni is not particularly limited, the charge-discharge capacity is gradually reduced if the composition ratio y of Ni exceeds 4. Considering about half of the maximum capacity as a standard, the composition ratio y of Ni is favorably equal to or lower than 10. Note that, if there are advantages from perspective of the durability, the ionic conductance, and the like, the composition ratio above 10.0 may be used at the sacrifice of the charge-discharge capacity.

In Formula (1), the composition ratio z of oxygen becomes a ratio at which oxygen is stably contained depending on the composition ratio of Ni and the composition ratio of P.

The positive-electrode active material film 12 may be formed of a lithium phosphoric acid compound expressed by Formula (2) in amorphous state.

$$Li_xCu_yPO_4 \qquad \text{Formula (2)}$$

(Where, x denotes a composition ratio of lithium. Y denotes a composition ratio of copper.)

The lithium composite oxide expressed by Formula (2) in amorphous state has the following excellent characteristics as the positive-electrode active material. That is, the lithium composite oxide has a high potential with respect to the Li+/Li pair. The lithium composite oxide is excellent in potential flatness, that is, potential variations due to composition changes are small. The lithium composite oxide also has a high composition ratio of lithium, and hence has a large capacity. The lithium composite oxide has a high electrical conductivity. Unlike a crystalline positive-electrode active material, the collapse of the crystal structure or the like due to repeated charge/discharge does not occur, and hence the charge-discharge cycle characteristics are also excellent. Further, the lithium composite oxide can be formed without annealing, simplification of the processes, an improvement of the yield, and use of the resin substrate are possible.

In the lithium phosphoric acid compound expressed by Formula (2), the range of the composition ratio x of lithium is, for example, $0.5 \le x < 7.0$ and may be $5 < x < 7.0$.

In the lithium phosphoric acid compound expressed by Formula (2), the range of the composition ratio y of copper is favorably $1.0 \le y \le 4.0$ because a sufficient charge-discharge capacity can be obtained. In particular, if the composition ratio y of copper is smaller than 1.0, the charge-discharge capacity is sharply reduced. Although the upper limit of the composition ratio y of copper is not particularly limited, the charge-discharge capacity is gradually reduced if the composition ratio y exceeds 3. Considering about half of the maximum capacity as a standard, the composition ratio y of copper is favorably equal to or smaller than 4. However, if there are advantages from perspective of the durability, the ionic conductance, and the like, the composition ratio above 4 may be used at the sacrifice of the charge-discharge capacity. Further, in the lithium phosphoric acid compound expressed by Formula (2), the lower limit of the composition ratio y of copper is favorably $2.2 \le y$ because good charge-discharge cycle characteristics can be obtained.

The composition of the lithium phosphoric acid compound forming the positive-electrode active material film 12 is determined in the following manner, for example. Under a deposition condition identical to the deposition condition of the positive-electrode active material film 12, a single-layer film similar to the positive-electrode active material film 12 is deposited on quartz glass. Then, composition analysis of this single-layer film is performed by X-ray photoelectron spectroscopy (XPS).

By the way, an increase in capacity of the positive-electrode active material is necessary for increasing the energy density in the secondary battery. Examples of the positive-electrode active material having a high capacity used for the lithium ion secondary battery or the like include a composite metal oxide (e.g., LixCoO2, LixNiO2, or LixMn2O4) roughly classified in a layered rock-salt structure or a spinel type structure. With this, the capacity is increased.

However, with these positive-electrode active materials, the structure collapse progresses as the cycle is repeated because they have the crystalline structure and it is also difficult to increase the number of reaction electrons because they have a high internal impedance. Further, it is known that, in the case of LixMn2O4 classified in the spinel type structure, if excess Li is contained in the active material, when 1<X<2, expansion and contraction of the volume due to jahn-teller ions ($Mn^{3+}$) occur and the potential is lowered (e.g., see J. M. Tarascan, J. Electrochem. Soc, 138,2864 (1991), T. Ohzuku, J. Electrochem. Soc, 137,769 (1990)).

In contrast, the positive-electrode active material according to the embodiment of the present application enables charge/discharge driving in amorphous state to be performed, and can suppress the expansion and contraction of the volume due to an insertion/desorption reaction of Li and suppress the structure change. Further, the positive-electrode active material according to the embodiment of the present application can widely contain Li as in, for example, the positive-electrode active material according to Formula (1) or Formula (2) above, and hence the capacity can be increased. For example, the positive-electrode active material can contain the lithium composition ratio x being less than 8 in Formula (1) and can contain the lithium composition ratio x being less than 7 in Formula (2).

Note that, in an all-solid-state secondary battery, it is necessary to deposit the collector, the positive-electrode active material, the electrolyte, and the negative electrode, and hence it is necessary to reduce the interface resistance and the internal resistance of the positive-electrode active material. The interface resistance is associated with formation of Li ion paths and the interface resistance becomes lower as the Li ion diffusion becomes easier. A main solution is an improvement of the ion conductivity of the electrolyte. Also interface control related to surface uniformity or adhesiveness of the layers also contributes to an improvement of the characteristics. Regarding the internal resistance of the positive-electrode active material, the film thickness cannot be increased unless the internal impedance is lowered. In the case of the all-solid-state secondary battery, the film thickness is proportional to the battery capacity, and hence the positive-electrode active material has to be deposited to have a large thickness. Therefore, the reduction of the internal impedance of the positive electrode contributes to the increased capacity. It is known that the positive-electrode active material according to the embodiment of the present application has a lower internal impedance than $LiCoO_2$ having the layered structure.

The positive-electrode active material film 12 may be formed of the lithium phosphoric acid compound in amorphous state containing Li, P, any element M1 selected from Ni, Co, Mn, Au, Ag, and Pd, at least one kind of element M2 (note that M1≠M2) selected from Ni, Co, Mn, Au, Ag, Pd, and Cu, and O. Such a lithium phosphoric acid compound can obtain a positive-electrode active material more excellent in characteristics by appropriately selecting the element M1 and the element M2, for example. For example, in the case where the positive-electrode active material film 12 is formed of the lithium phosphoric acid compound in amorphous state containing Li, P, Ni (element M1), Cu (element M2), and O, it is possible to further improve the charge-discharge cycle characteristics. For example, in the case where the positive-electrode active material film 12 is formed of the lithium phosphoric acid compound in amorphous state containing Li, P, Ni (element M1), Pd (element M2), and O, it is possible to further increase the capacity and further improve the charge-discharge cycle characteristics. For example, in the case where the positive-electrode active material film 12 is formed of the lithium phosphoric acid compound in amorphous state containing Li, P, Ni (element M1), Au (element M2), and O, it is possible to further improve the charge-discharge cycle characteristics.

The positive-electrode active material film 12 may be formed of a lithium phosphoric acid compound in amorphous state containing Li, P, any element M1 selected from Ni, Co, Mn, Au, Ag, and Pd, at least one kind of element M2 (note that M1≠M2) selected from Ni, Co, Mn, Au, Ag, Pd, and Cu, at least one kind of additional element M3 selected from B, Mg, Al, Si, Ti, V, Cr, Fe, Zn, Ga, Ge, Nb, Mo, In, Sn, Sb, Te, W, Os, Bi, Gd, Tb, Dy, Hf, Ta, and Zr, and O.

The positive-electrode active material film 12 may be formed of a lithium phosphoric acid compound in amorphous state containing Li, P, any element M1' selected from Ni, Co, Mn, Au, Ag, Pd, and Cu, at least one kind of additional element M3 selected from B, Mg, Al, Si, Ti, V, Cr, Fe, Zn, Ga, Ge, Nb, Mo, In, Sn, Sb, Te, W, Os, Bi, Gd, Tb, Dy, Hf, Ta, and Zr, and O.

If only the additional element M3 is contained in the lithium phosphoric acid compound, the resulting lithium phosphoric acid compound cannot be used as the positive-electrode active material. That is, if the positive-electrode active material film 12 is formed of a lithium phosphoric acid compound in amorphous state containing Li, P, only the additional element M3, and O, the battery cannot be driven. If the additional element M3 is contained in the lithium phosphoric acid compound together with the element M1 and the element M2 (M1≠M2) or the element M1', the resulting lithium phosphoric acid compound can be used as the positive-electrode active material. In addition, in this case, depending on the selected kind of added elements, the characteristics as the positive-electrode active material can be improved. That is, even in the case where the positive-electrode active material film 12 is formed of the additional element M3 contained in the lithium phosphoric acid compound together with the element M1 and the element M2 (M1≠M2) or the element M1', it does not affect driving of the battery. In addition, in the case where the positive-electrode active material film 12 is formed of the additional element M3 contained in the lithium phosphoric acid compound together with the element M1 and the element M2 (M1≠M2) or the element M1', depending on the selected kind of added elements, effects of increasing the capacity and improving the cycle characteristics, lowering the internal impedance, and the like are obtained.

For example, the following is considered to be favorable as the additional element M3. That is, it is generally considered that, in ion conduction, disturbing a structure having a conductivity causes ions to easily move. It is actually known that the solid-state electrolyte of $Li_3PO_4$ is increased in ionic conductance by doping nitrogen to partially replace the solid-state electrolyte, for example, as $Li_3PO_{3.7}N_{O.3}$. By the way, in the case of a crystalline material, an ion conduction path is formed of a structure (crystals) as well ordered as possible. A method of increasing the ion conductance by partially replacing the material inside the crystals to form holes is employed for the crystalline material. Thus, they are common in view of increasing paths through which lithium easily moves in the solid-state electrolyte. The material having an increased ionic conductance in the crystalline material is often effective in the amorphous material. It can be considered that an additional matter (additional element) of such a material having an increased ionic conductance is also effective in the amorphous positive-electrode active material according to the embodiment of the present application (lithium phosphoric acid compound in amorphous state). As a lithium oxide solid-state electrolyte material being a material having an increased ionic conductance in the crystalline material, other than $Li_{1.3}Al_{0.3}Ti_{1.7}(PO_4)_3$ (LATP), many materials including $Li_{0.5}La_{0.5}TiO_3$ and $Li_{3.5}Zn_{0.35}GeO_4$ are exemplified. Thus, it is considered that Al, Ti, La, Zn, and Ge that are additional elements of these materials, and other Si, V, W, Ga, Ta, Zr, Cr, and Pd can further improve the characteristics such as the ionic conductance and effective also in the amorphous positive-electrode active material according to the embodiment of the present application.

For example, if the positive-electrode active material film 12 is formed of a lithium phosphoric acid compound in amorphous state containing Li, P, Ni (element M1'), at least one kind (additional element M3) of Al and Ti, and O, it is possible to lower the internal impedance and obtain excellent high-rate discharge characteristics. The internal impedance is lowered, and hence the change in potential during high-speed discharge is reduced and it is possible to realize a battery having a higher potential. In addition, the internal impedance is low, and hence a ratio of a discharge energy to a charge energy (discharge energy/charge energy) approaches 1. Thus, the energy loss is reduced and the energy efficiency is increased. Further, Joule heat in charge/discharge is lowered, and hence an effect of reducing heat generation is expected.

This positive-electrode active material film 12 typically does not have a crystalline phase, for example, and is a thin film having a completely amorphous single phase. The fact that this positive-electrode active material film 12 is the amorphous single phase can be checked by observing a cross section thereof by a transmission electron microscope (TEM). That is, when the cross section of the positive-electrode active material film 12 is observed by the transmission electron microscope (TEM), the absence of crystalline particles in the TEM image can be checked. The absence of crystalline particles can also be checked by electron diffraction.

(Solid-State Electrolyte Film)

As the material of the solid-state electrolyte film 13, lithium phosphate ($Li_3PO_4$), $Li_3PO_{4-x}N_x$ (in general, referred to as LiPON) obtained by adding nitrogen to lithium phosphate ($Li_3PO_4$), $Li_xB_2O_{3-y}N_y$, $Li_4SiO_4$—$Li_3PO_4$, $Li_4SiO_4$—$Li_3VO_4$, and the like may be used. Note that x (x>0) or y (y>0)) that is a subscript used in the compound denotes a composition ratio of an element in a formula.

(Lithium-Excess Layer)

In the solid-state electrolyte secondary battery, a negative-electrode active material layer is not formed and a negative-electrode active material is generated on the negative electrode side along with charge. A layer excessively including Li metal and/or Li (Li-excess layer) generated between the negative-electrode-side collector film 14 and the solid-state electrolyte film 13 is generated on the negative electrode side. While utilizing Li (Li-excess layer) excessively deposited as the negative-electrode active material, the solid-state electrolyte secondary battery has a high durability against repeated charge/discharge without deteriorating the charge/discharge characteristics.

(Negative-Electrode-Side Collector Film)

As the material of the negative-electrode-side collector film 14, Cu, Mg, Ti, Fe, Co, Ni, Zn, Al, Ge, In, Au, Pt, Ag, Pd, or the like or an alloy including any of them can be used.

Note that an inorganic insulating film may be formed on the entire protective film 15. Alternatively, an inorganic insulating film may be formed on the surface of the substrate 10. The material of the inorganic insulating film only needs to be a material from which a film having low hygroscopicity and having moisture resistance can be formed. As such a material, an oxide, nitride, or sulfide of Si, Cr, Zr, Al, Ta, Ti, Mn, Mg, and Zn or a mixture thereof can be used. More specifically, $Si_3N_4$, $SiO_2$, $Cr_2O_3$, $ZrO_2$, $Al_2O_3$, $TaO_2$, $TiO_2$, $Mn_2O_3$, MgO, ZnS, or the like or a mixture thereof is used.

(Method of Manufacturing Solid-State Electrolyte Secondary Battery)

The above-mentioned solid-state electrolyte secondary battery is manufactured, for example, in the following manner. First, the positive-electrode-side collector film 11, the positive-electrode active material film 12, the solid-state electrolyte film 13, and the negative-electrode-side collector film 14 are formed on the substrate 10 in the stated order. As a result, a laminated body is formed. Next, the entire protective film 15 formed of, for example, an ultraviolet-curing resin is formed to entirely cover the laminated body. As a result of such a sequence of processes, a solid-state electrolyte secondary battery can be manufactured.

(Method of Forming Thin Film)

A method of forming a thin film such as the positive-electrode-side collector film 11, the positive-electrode active material film 12, the solid-state electrolyte film 13, and the negative-electrode-side collector film 14 will be described.

Each thin film can be formed by, for example, a deposition process such as a physical vapor deposition (PVD) process or a chemical vapor deposition (CVD) process. Alternatively, the thin film can be formed by a liquid phase process such as electroplating, electroless plating, an application process, and a sol-gel process. Alternatively, the thin film can be formed by a solid phase process such as a solid phase epitaxy (SPE) process and a Langmuir-Blodgett (LB) process.

The PVD process is a process in which a thin-film raw material to be formed into a thin film is evaporated/vaporized by energy such as heat and plasma and deposited as a thin film on the substrate. Examples of the PVD process include a vacuum deposition process, a sputtering process, ion plating, a molecular beam epitaxy (MBE) process, and laser abrasion.

The CVD process is a process in which a decomposition/reaction/intermediate product of raw material gas molecules is formed by adding energy such as heat, light, and plasma to a constituent material of a thin film supplied as gas, and the formed product is deposited as a thin film through adsorption, reaction, and desorption on the surface of the substrate.

Examples of the CVD process may include a thermal CVD process, a metal organic chemical vapor deposition (MOCVD) process, an RF plasma CVD process, an optical CVD process, a laser CVD process, and a liquid phase epitaxy (LPE) process.

It is easy for those skilled in the art to form a thin film having a desired configuration by the above-mentioned thin-film formation method. For example, it is easy for those skilled in the art to form the positive-electrode-side collector film 11, the positive-electrode active material film 12, the solid-state electrolyte film 13, and the negative-electrode-side collector film 14 by the above-mentioned thin-film formation method. That is, by appropriately selecting a thin-film raw material, a thin-film formation method, a thin-film formation condition, and the like, those skilled in the art can easily form the positive-electrode-side collector film 11, the positive-electrode active material film 12, the solid-state electrolyte film 13, and the negative-electrode-side collector film 14 having a desired configuration.

(Configuration of All-Solid-State Thin-Film Battery)

Next, a configuration example of a stacking-type all-solid-state thin-film battery in which a plurality of unit batteries as described above are stacked on one another will be described. This all-solid-state thin-film battery includes a plurality of stacked unit batteries C1 to C4 (four in example shown in FIGS. 3A and 3B) as shown in FIGS. 3A and 3B. The stacked unit batteries C1 to C4 are connected to one another in series and/or in parallel to form one combined battery. Note that, in the example shown in FIG. 3B, the unit batteries C1 to C4 are connected to one another in parallel.

This all-solid-state thin-film battery includes a battery main body portion 31*a*, a terminal portion 31*b*1, and a terminal portion 31*b*2.

(Battery Main Body Portion)

The battery main body portion 31*a* is constituted of a plurality of battery element portions 21*a* of the stacked unit batteries C1 to C4.

(Terminal Portion)

The terminal portion 31*b*1 is constituted of a protective foil 18, a plurality of connection portions 21*b*1 extended in the same direction from each of the plurality of battery element portions 21*a*, and a conductive agent 17 filling between the connection portions 21*b*1 and between the connection portion 21*b*1 and the protective foil 18. The terminal portion 31*b*2 is constituted of a protective foil 18, a plurality of connection portions 21*b*2 extended in the same direction from each of the plurality of battery element portions 21*a*, and a conductive agent 17 filling between the connection portions 21*b*2 and between the connection portion 21*b*2 and the protective foil 18.

The terminal portion 31*b*1 is, for example, one in which the plurality of connection portions 21*b*1 extended in the same direction from each of the plurality of battery element portions 21*a* and the conductive agent 17 are covered with the protective foil 18, to thereby be bundled together. In the terminal portion 31*b*1, the protective foil 18 and the positive-electrode-side collector film 11 included in the plurality of connection portions 21*b*1 are electrically conducted to each other via the conductive agent 17.

The terminal portion 31*b*2 is, for example, one in which the plurality of connection portions 21*b*2 extended in the same direction from each of the plurality of battery element portions 21*a* and the conductive agent 17 are covered with the protective foil 18, to thereby be bundled together. In the terminal portion 31*b*2, the protective foil 18 and the negative-electrode-side collector film 14 included in the plurality of connection portions 21*b*2 are electrically conducted to each other via the conductive agent 17. Note that, hereinafter, the terminal portions 31*b*1 and 31*b*2 will be referred to as terminal portions 31*b* unless they are differentiated from each other.

As the protective foil 18, a foil-like conductive member such as a copper foil can be used, for example. As the conductive agent 17, for example, a conductive paste such as a silver paste or a conductive material such as a solder can be used. The plurality of unit batteries C1 to C4 are connected to one another in parallel by the terminal portion 31*b*1 and the terminal portion 31*b*2 and an electric current is taken out from the unit batteries C1 to C4 connected to one another in parallel to the outside.

(Structure of Connection Portion)

In the stacking-type all-solid-state thin-film battery according to the embodiment of the present application, the plurality of connection portions 21*b*1 and 21*b*2 respectively included in the terminal portion 31*b*1 and the terminal portion 31*b*2 have a predetermined structure. That is, each of connection portion combinations each formed of the connection portions adjacent to each other in the stacking direction via the conductive agent 17 is set to have a first structure in which a part of one connection portion and a part of the other connection portion overlap with each other or a second structure in which an entire portion of the one connection portion and an entire portion of the other connection portion do not overlap with each other in the stacking direction.

In the first embodiment, as shown in FIG. 3A, all the plurality of connection portion combinations are each set to have the first structure in which the part of the one connection portion 21*b* and the part of the other connection portion 21*b* overlap with each other in the stacking direction.

To be specific, the terminal portion 31*b*1 includes four connection portions 21*b*1 extended in the same direction. The four connection portions 21*b*1 are constituted of the connection portion 21*b*1 extended from the battery element portion 21*a* of the unit battery C1, the connection portion 21*b*1 extended from the battery element portion 21*a* of the unit battery C2, the connection portion 21*b*1 extended from the battery element portion 21*a* of the unit battery C3, and the connection portion 21*b*1 extended from the battery element portion 21*a* of the unit battery C4.

Out of the plurality of connection portions 21*b*1, the connection portion 21*b*1 of the unit battery C1 and the connection portion 21*b*1 of the unit battery C2 are adjacent to each other in the stacking direction via the conductive agent 17. The connection portion 21*b*1 of the unit battery C2 and the connection portion 21*b*1 of the unit battery C3 are adjacent to each other in the stacking direction via the conductive agent 17. The connection portion 21*b*1 of the unit battery C3 and the connection portion 21*b*1 of the unit battery C4 are adjacent to each other in the stacking direction via the conductive agent 17. Each of the connection portion combinations is set to have a structure in which a part of one connection portion 21*b*1 and a part of the other connection portion 21*b*1 overlap with each other in the stacking direction.

Similarly, the terminal portion 31*b*2 includes four connection portions 21*b*2 extended in the same direction. The four connection portions 21*b*2 are constituted of the connection portion 21*b*2 extended from the battery element portion 21*a* of the unit battery C1, the connection portion 21*b*2 extended from the battery element portion 21*a* of the unit battery C2, the connection portion 21*b*2 extended from the battery element portion 21*a* of the unit battery C3, and the connection portion 21*b*2 extended from the battery element portion 21*a* of the unit battery C4.

Out of the plurality of connection portions 21*b*2, the connection portion 21*b*2 of the unit battery C1 and the connection portion 21*b*2 of the unit battery C2 are adjacent to each other in the stacking direction via the conductive agent 17. The connection portion 21*b*2 of the unit battery C2 and the connection portion 21*b*2 of the unit battery C3 are adjacent to each other in the stacking direction via the conductive agent 17. The connection portion 21b2 of the unit battery C3 and the connection portion 21b2 of the unit battery C4 are adjacent to each other in the stacking direction via the conductive agent 17. Each of the connection portion combinations is set to have a structure in which a part of one connection portion 21b2 and a part of the other connection portion 21b2 overlap with each other in the stacking direction.

Each of the connection portion combinations each formed of the connection portions adjacent to each other in the stacking direction is set to have the above-mentioned structure, and hence it is possible to reduce the thickness of the conductive agent 17 between the connection portions and to set a thickness L2 of the terminal portion 31b to be equal to or smaller than a thickness L1 of the battery main body portion 31a. With this, it is possible to increase the volume energy density of the stacking-type all-solid-state thin-film battery. Further, with the above-mentioned structure, a fillet is easily formed around outer peripheries of the connection portions 21b overlapping with one another in the stacking direction, and hence the stability of connection between the connection portions 21b via the conductive agent 17 can be improved.

(Shape of Connection Portion)

Although the connection portion 21b shown in FIG. 3A has a rectangular plane shape, the shape of the connection portion 21b is not limited thereto and various shapes can be employed. For example, a polygonal plane shape other than the rectangular shape, a plane shape having a curved line, or a shape having a hole that is obtained by forming the hole in a part of each of these shapes may be used. FIGS. 4A to 4D show examples of such shapes. The connection portion 21b shown in FIG. 4A has a shape having a curved line. The connection portion 21b shown in FIG. 4B has a trapezoidal shape as an example of the polygonal shapes. The connection portion 21b shown in FIG. 4C has a pentagonal plane shape as an example of the polygonal shapes. The connection portion 21b shown in FIG. 4D has a pentagonal plane shape having a hole 22.

Among these shapes, a shape having a long length of the overlapping outer peripheries of the connection portions 21b stacked in the stacking direction, for example, the plane shape having the curved line, the shape having the hole 22, or the polygonal plane shape having four or more corners is favorable. That is because, as the length of the overlapping outer peripheries of the connection portions 21b stacked in the stacking direction is longer, a fillet-formed portion becomes larger, and hence the connection between the connection portions 21b via the conductive agent 17 becomes more stable.

(Method of Manufacturing All-Solid-State Thin-Film Battery)

The above-mentioned all-solid-state thin-film battery can be manufactured, for example, in the following manner. First, the unit batteries C1 to C4 shown in FIGS. 2A and 2B are prepared and stacked in order as shown in FIG. 3A. Then, for example, the conductive agent 17 in paste state is applied to the plurality of connection portions 21b1, and cured. After that, the connection portions 21b1 and the conductive agent 17 are covered with the protective foil to be bundled together, such that the terminal portion 31b1 is formed. Similarly, for example, the conductive agent 17 in paste state is applied to the plurality of connection portions 21b2, and cured. Then, the connection portion 21b2 and the conductive agent 17 are covered with the protective foil to be bundled together, such that the terminal portion 31b2 is formed. In this manner, the above-mentioned thin-film all-solid-state electrolyte battery can be obtained.

2. Second Embodiment

A battery according to a second embodiment will be described. The second embodiment is the same as the first embodiment except for that the connection portions have a different structure. Thus, in the following, the structure of the connection portions that is different from that in the first embodiment will be described in detail, and detailed descriptions of other points will be appropriately omitted because the other points are the same as those in the first embodiment.

(Structure of Connection Portions)

Figure 5:
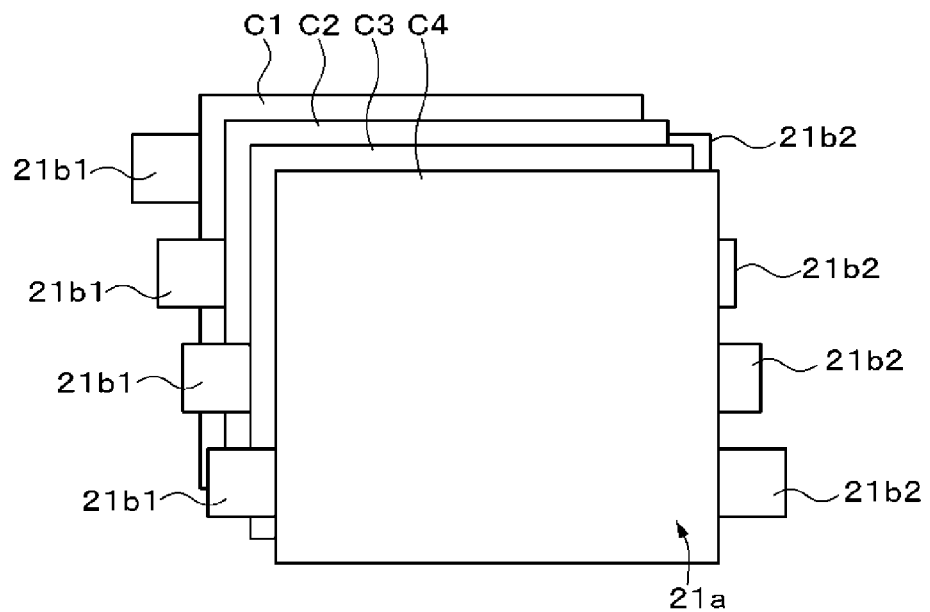
FIG. 5 is a schematic diagram showing a configuration example of an all-solid-state thin-film battery according to a second embodiment of the present application.

FIG. 5 is a schematic diagram showing a configuration example of an all-solid-state thin-film battery according to a second embodiment of the present application. In the second embodiment, all the connection portion combinations each formed of the connection portions 21b that are extended in the same direction from the battery element portions 21a and adjacent to each other in the stacking direction via the conductive agent 17 are set to have a second structure in which an entire portion of one connection portion 21b and an entire portion of the other connection portions 21b do not overlap with each other in the stacking direction.

Specifically, on a side of one side of two opposed sides, all the connection portion combinations each formed of the connection portions 21b1 adjacent to each other in the stacking direction are each set to have a second structure in which an entire portion of one connection portion 21b1 and an entire portion of the other connection portion 21b1 do not overlap with each other in the stacking direction. Further, on a side of the other side of the two opposed sides, all the connection portion combinations each formed of the connection portions 21b2 adjacent to each other in the stacking direction are each set to have a second structure in which an entire portion of one connection portion 21b2 and an entire portion of the other connection portion 21b2 do not overlap with each other in the stacking direction.

3. Third Embodiment

A third embodiment will be described. The third embodiment is the same as the first embodiment except for that the structure of the connections is different. Thus, hereinafter, the structure of the connections different from that in the first embodiment will be described in details and detailed descriptions of other points will be appropriately omitted because the other points are the same as those in the first embodiment.

(Structure of Connection Portions)

Figure 6:
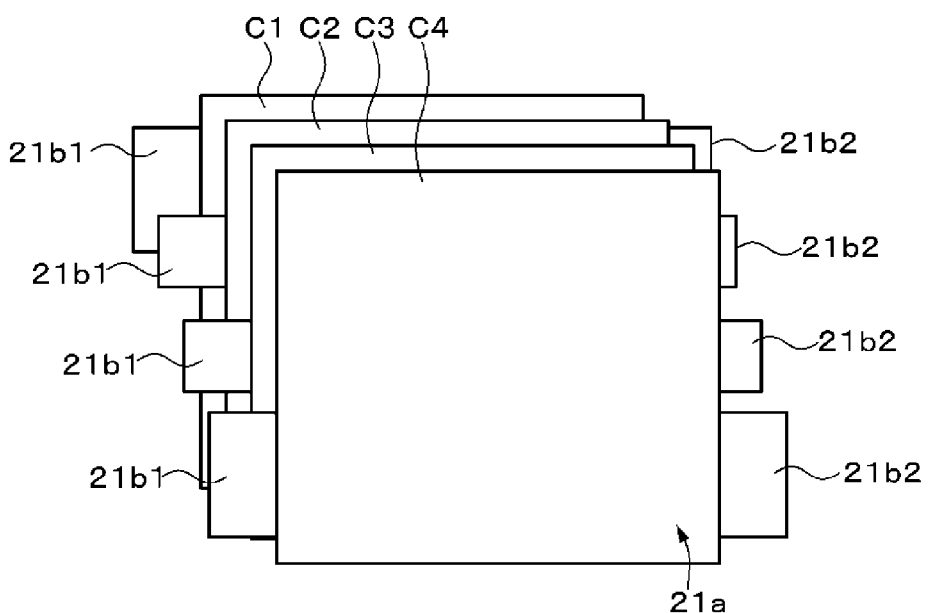
FIG. 6 is a schematic diagram showing a configuration example of an all-solid-state thin-film battery according to a third embodiment of the present application.

FIG. 6 is a schematic diagram showing a configuration example of an all-solid-state thin-film battery according to the third embodiment of the present application. In the third embodiment, each of the connection portion combinations each formed of the connection portions 21b that are extended in the same direction from the battery element portions 21a and adjacent to each other in the stacking direction via the conductive agent 17 is set to have the first structure or the second structure and the connection portion combinations are configured to have both of the first structure and the second structure.

In the example shown in FIG. 6, two connection portion combinations (connection portion combination formed of connection portion 21b1 of unit battery C2 and connection portion 21b1 of unit battery C3 and connection portion combination formed of connection portion 21b1 of unit battery C3 and connection portion 21b1 of unit battery C4) of three connection portion combinations on a side of one side of two opposed sides are set to have the second structure. Specifically, each of the two connection portion combinations is set to have the second structure in which an entire portion of one connection portion 21b1 and an entire portion of the other connection portion 21b1 of each of those connection portion combinations do not overlap with each other in the stacking direction. One connection portion combination (connection portion combination formed of connection portion 21b1 of unit battery C1 and connection portion 21b1 of unit battery C2) is set to have the first structure. Specifically, the one connection portion combination is set to have the first structure in which a part of one connection portion 21b1 and a part of the other connection portion 21b1 of that connection portion combination overlap with each other in the stacking direction.

Two connection portion combinations (connection portion combination formed of connection portion 21b2 of unit battery C2 and connection portion 21b2 of unit battery C3 and connection portion combination formed of connection portion 21b2 of unit battery C3 and connection portion 21b2 of unit battery C4) of three connection portion combinations on the other side of the two opposed sides are set to have the second structure. Specifically, each of the two connection portion combinations is set to have the second structure in which an entire portion of one connection portion 21b2 of each of those connection portion combinations and an entire portion of the other connection portion 21b2 do not overlap with each other in the stacking direction. One connection portion combination (connection portion combination formed of connection portion 21b2 of unit battery C1 and connection portion 21b2 of unit battery C2) is set to have the first structure. Specifically, the one connection portion combination is set to have the first structure in which a part of one connection portion 21b2 and a part of the other connection portion 21b2 overlap with each other in the stacking direction.

4. Application Examples

Application examples of the above-mentioned battery will be described. The all-solid-state thin-film battery described above can be used to be installed in an electronic apparatus, for example, a compact electronic apparatus such as a radio frequency identification (RFID) tag and a card-type battery money or to supply electric power thereto, utilizing merits of thin shape, light weight, and flexibility, for example. Note that these application examples of the battery are not limited to these application examples.

5. Other Embodiments

The present application is not limited to the above-mentioned embodiments of the present application and various modifications and applications can be made without departing from the gist of the present application.

For example, the configurations, methods, steps, shapes, materials, numerical values, and the like shown in the above-mentioned embodiments and examples are merely examples and different configurations, methods, steps, shapes, materials, numerical values, and the like may be used depending on needs.

Further, the configurations, methods, steps, shapes, materials, numerical values, and the like of the above-mentioned embodiments and examples can be combined with one another without departing from the gist of the present application.

For example, the film configuration of the all-solid-state thin-film battery according to the above-mentioned embodiments is not limited to the above. For example, in the first embodiment to the third embodiment, a protective film may be formed between the negative-electrode-side collector film and the solid-state electrolyte film. The protective film may be formed of the same material as, for example, the material of the positive-electrode active material that forms the positive-electrode active material film. A negative-electrode active material film may be formed between the negative-electrode-side collector film and the solid-state electrolyte film.

Further, the structure of the solid-state electrolyte battery according to each of the above-mentioned embodiments is not limited to the above-mentioned examples. For example, the present application is applicable to, for example, a solid-state electrolyte secondary battery having a structure in which an electrical conductive substrate is used as the substrate 10 and the positive-electrode-side collector film is omitted. Further, each of the members that constitute the solid-state electrolyte battery does not need to have a thin film shape.

Further, although the configuration in which the plurality of unit batteries are stacked in a vertical direction has been described, the present application is applicable to a configuration in which the plurality of unit batteries are stacked in a horizontal direction.

Further, the present application is applicable also to a battery including a laminated electrode body in which a plurality of plate-shaped positive electrodes and plate-shaped negative electrodes are stacked on one another. The laminated electrode body includes, for example, a main body portion including a plurality of stacked electrode portions (positive electrode and negative electrode) and terminal portions in which a plurality of connection portions extended in the same direction from each of the plurality of electrode portions are conducted to one other via a conductive agent provided between the connection portions. Each of connection portion combinations each formed of the plurality of connection portions adjacent to each other in the stacking direction via the conductive agent is set to have a first structure in which a part of one connection portion and a part of the other connection portion overlap with each other in the stacking direction or a second structure in which an entire portion of the one connection portion and an entire portion of the other connection portion do not overlap with each other. Note that a separator and/or an electrolyte layer may be provided between the positive electrode and the negative electrode in the laminated electrode body.

The present application may take the following configurations.

[1] A battery comprising:
a plurality of unit batteries arranged in a stacking direction, each unit battery including a battery element portion and at least one connection portion extending from a side of the battery element portion,
wherein a plurality of the connection portions extend from a first side of the unit batteries, and a distance in the stacking direction between at least two of said connection portions decreases as said connection portions extend away from the sides of the respective battery element portions.

[2] The battery according to [1], further comprising a conductive agent that connects the connection portions on the first side of the unit batteries.

[3] The battery according to [2],
wherein a terminal portion includes the connection portions on the first side of the unit batteries and the conductive agent, and
wherein a thickness of the terminal portion is less than a combined thickness of the plurality of battery element portions.

[4] The battery according to [2], further comprising a protective foil covering the conductive agent, wherein the conductive agent, the connection portions on the first side of the unit batteries, and the protective foil form a terminal portion.

[5] The battery according to any one of [1] to [4], wherein the plurality of connection portions form at least one of:
a first connection portion structure including two connection portions on one side of the unit batteries that overlap in the stacking direction; and
a second connection portion structure including two connection portions on one side of the unit batteries that do not overlap in the stacking direction.

[6] The battery according to [5], wherein the plurality of connection portions include at least one first connection portion structure, and at least one second connection portion structure.

[7] The battery according to [5], wherein at least one side of the unit batteries includes at least one first connection portion structure, and at least one second connection portion structure.

[8] The battery according to any one of [1] to [7], wherein at least one of the connection portions has a shape selected from the group consisting of a rectangular shape, a planar shape having a curved edge, a trapezoidal shape, and a pentagonal shape.

[9] The battery according to [8], wherein the shape of the connection portion includes a hole formed therein.

[10] The battery according to any one of [1] to [9], wherein each unit battery includes at least a positive-electrode-side collector, a positive electrode active material layer, an electrolyte, and a negative-electrode-side collector.

[11] The battery according to [10], wherein each unit battery further comprises a Li-excess layer excessively including Li metal between the negative-electrode-side collector film and the solid-state electrolyte film.

[12] The battery according to [10] or [11], wherein each unit battery further comprises a substrate upon which the positive-electrode-side collector film is formed, and a protective film formed on the negative-electrode-side collector film.

[13] The battery according to [12], wherein at least one of the connection portions include the substrate and either the positive-electrode-side collector film or the negative-electrode-side collector film of a respective unit battery.

[14] The battery according to [12] or [13], further comprising an inorganic insulating film formed on at least one of the substrate and the protective film for at least one of the battery units.

[15] The battery according to any one of [12] to [14], wherein the substrate is flexible.

[16] The battery according to any one or [10] to [15], wherein the positive-electrode-side collector film includes a positive-electrode active material including a lithium phosphoric acid compound in an amorphous state that is expressed by Formula (1)

$$Li_xNi_yPO_z \quad \text{Formula (1)}$$

where x denotes a composition ratio of lithium, y denotes a composition ratio of nickel, x is 0<x<8.0, y is 2.0<y<1, and z is a composition ratio of oxygen.

[17] The battery according to any one of [2] to [16], wherein the conductive agent is a solder, or a paste.

[18] The battery according to any one of [4] to [17], wherein the protective foil is a copper foil.

[19] The battery according to any one of [1] to [18], wherein the battery is a solid-state thin-film battery.

[20] A battery comprising:
a plurality of unit batteries arranged in stacking direction, each unit battery including a battery element portion and at least one connection portion extending from a side of the battery element portion,
wherein a plurality of the connection portions extend from a first side of the unit batteries and are connected by a conductive agent.

[21] An electronic apparatus that uses the battery according to any one of [1] to [20]. Furthermore, the present application may also take the following configurations.

[1A] A battery, including:
a main body portion including a plurality of stacked battery element portions; and
a terminal portion in which a plurality of connection portions extended in the same direction from each of the plurality of battery element portions are conducted to each other via a conductive agent provided between the connection portions, each of connection portion combinations each formed of the connection portions adjacent to each other in a stacking direction being set to have one of
a first structure in which a part of one connection portion and a part of the other connection portion overlap with each other in the stacking direction, and
a second structure in which an entire portion of the one connection portion and an entire portion of the other connection portion are prevented from overlapping with each other in the stacking direction.

[2A] The battery according to [1A], in which
the terminal portion further includes
a protective foil configured to cover the plurality of connection portions and the conductive agent to be bundled together.

[3A] The battery according to [1A] or [2A], in which
the connection portion combinations are all set to have the first structure.

[4A] The battery according to [1A] or [2A], in which
the connection portion combinations are all set to have the second structure.

[5A] The battery according to any one of [1A] to [4A], in which
the connection portions each have a plane shape that is at least one shape selected from a polygonal shape, a shape having a curved line, a shape having a corner and a curved line, and a shape having a hole.

[6A] The battery according to any one of [1A] to [5A], in which
each of the battery element portions is a unit battery including a pair of a positive electrode and a negative electrode and a solid-state electrolyte.

[7A] The battery according to [6A], in which
the unit battery has a stacking structure in which a positive-electrode-side layer including the positive electrode, a negative-electrode-side layer including the negative electrode, and a solid-state electrolyte layer including the solid-state electrolyte are stacked on one another.

[8A] The battery according to [7A], in which
layers constituting the positive-electrode-side layer, layers constituting the negative-electrode-side layer, and the solid-state electrolyte layer are formed of thin films.

[9A] The battery according to [8A], in which
the unit battery further includes a substrate, and
each of the connection portions is formed of
- a side end portion of the substrate, and
- a collector layer included in one of the positive-electrode-side layer and the negative-electrode-side layer formed on the side end portion of the substrate.

[10A] The battery according to [9A], in which
the substrate is a resin substrate.

[11A] A battery, including:
a main body portion including a plurality of stacked electrode portions; and
a terminal portion in which a plurality of connection portions extended in the same direction from each of the plurality of electrode portions are conducted to each other via a conductive agent provided between the connection portions, each of connection portion combinations each formed of the connection portions adjacent to each other in a stacking direction including a laminated electrode body that is set to have one of
- a first structure in which a part of one connection portion and a part of the other connection portion overlap with each other in the stacking direction, and
- a second structure in which an entire portion of the one connection portion and an entire portion of the other connection portion are prevented from overlapping with each other in the stacking direction.

[12A] An electronic apparatus that uses the battery according to [1A] or [11A].

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A battery comprising: a plurality of unit thin-film batteries stacked in a stacking direction, each unit thin-film battery comprising a thin-layer battery element portion and a connection portion extending from a side of the thin-layer battery element portion outward away from the thin-layer battery cell into an edge of the battery, wherein a distance in the stacking direction between at least two of the connection portions decreases as the connection portions extend away from the sides of the respective thin-layer battery element portions in the edge of the battery; and
wherein each unit thin-film battery comprises two connection portion extending from two opposing sides of the respective thin-layer battery element portion outward away from the thin-layer battery element portion in two opposing edges of the battery, the distance in the stacking direction between at least two of the connection portions decreases as the connection portions extend away from the two opposing sides of the respective thin-layer battery element portion in the two opposing edges of the battery.

2. The battery according to claim 1, further comprising a conductive agent that connects the connection portions on a first side of the unit thin-film batteries.

3. The battery according to claim 2, further comprising a terminal portion that includes the connection portions on a first side of the thin-film unit batteries and the conductive agent, and wherein a thickness of the terminal portion is less than a combined thickness of the thin-layer battery element portions.

4. The battery according to claim 2, further comprising a protective foil covering the conductive agent, wherein the conductive agent, the connection portions on a first side of the thin-film unit batteries, and the protective foil form a terminal portion.

5. The battery according to claim 1, wherein the connection portions form at least one of a first connection portion structure including two connection portions on one side of the thin-film unit batteries that overlap in the stacking direction and a second connection portion structure including two connection portions on one side of the thin-film unit batteries that do not overlap in the stacking direction.

6. The battery according to claim 5, wherein the connection portions include at least one first connection portion structure and at least one second connection portion structure.

7. The battery according to claim 5, wherein at least one side of the thin-film unit batteries includes at least one first connection portion structure and at least one second connection portion structure.

8. The battery according to claim 1, wherein at least one of the connection portions has a shape selected from the group consisting of a rectangular shape, a planar shape having a curved edge, a trapezoidal shape, and a pentagonal shape.

9. The battery according to claim 8, wherein the shape of the at least one of the connection portion includes a hole formed therein.

10. The battery according to claim 1, wherein each thin-film unit battery includes at least a positive-electrode-side collector film, a positive electrode active material layer, an electrolyte, and a negative-electrode-side collector film.

11. The battery according to claim 10, wherein each thin-film unit battery further comprises a Li-excess layer excessively including Li metal between the negative-electrode-side collector film and the solid-state electrolyte film.

12. The battery according to claim 10, wherein each thin-film unit battery further comprises (i) a substrate upon which the positive-electrode-side collector film is formed and (ii) a protective film formed on the negative-electrode-side collector film.

13. The battery according to claim 12, wherein at least one of the connection portions include the substrate and either the positive-electrode-side collector film or the negative-electrode-side collector film of the respective thin-film unit battery.

14. The battery according to claim 12, further comprising an inorganic insulating film formed on at least one of the substrate and the protective film for at least one of the thin-film unit batteries.

15. The battery according to claim 12, wherein the substrate is flexible.

16. The battery according to claim 10, wherein the positive-electrode-side collector film includes a positive-electrode active material including a lithium phosphoric acid compound in an amorphous state that is expressed by $Li_xNi_yPO_z$, where x denotes a composition ratio of lithium, y denotes a composition ratio of nickel, x is $0<x<8.0$, y is $2.0<y<1$, and z is a composition ratio of oxygen.

17. The battery according to claim 2, wherein the conductive agent is a solder or a paste.

18. The battery according to claim 1, wherein the battery is a solid-state thin-film battery.

19. An electronic apparatus that uses the battery according to claim 1.

* * * * *